US011862883B2

(12) United States Patent
Jin

(10) Patent No.: US 11,862,883 B2
(45) Date of Patent: Jan. 2, 2024

(54) ELECTRICAL CONNECTOR HAVING CONDUCTIVE TERMINALS WITH HIGH DENSITY AND LOW HEIGHT

(71) Applicant: LOTES CO., LTD, Keelung (TW)

(72) Inventor: Zuo Feng Jin, Keelung (TW)

(73) Assignee: LOTES CO., LTD, Keelung (TW)

( * ) Notice: Subject to any disclaimer, the term of this patent is extended or adjusted under 35 U.S.C. 154(b) by 204 days.

(21) Appl. No.: 17/509,190

(22) Filed: Oct. 25, 2021

(65) Prior Publication Data

US 2023/0018797 A1 Jan. 19, 2023

(30) Foreign Application Priority Data

Jul. 16, 2021 (CN) ......................... 202121630699.1

(51) Int. Cl.

| | |
|---|---|
| ***H01R 13/24*** | (2006.01) |
| ***H01R 13/502*** | (2006.01) |
| ***H01R 12/55*** | (2011.01) |
| ***H01R 13/516*** | (2006.01) |

(52) U.S. Cl.

CPC ......... *H01R 13/2435* (2013.01); *H01R 12/55* (2013.01); *H01R 13/2407* (2013.01); *H01R 13/502* (2013.01); *H01R 13/516* (2013.01)

(58) Field of Classification Search

CPC ................ H01R 13/2435; H01R 12/55; H01R 13/2407; H01R 13/502; H01R 13/516; H01R 13/2492; H01R 13/415; H01R 12/7082

USPC ............................................................. 439/66

See application file for complete search history.

(56) References Cited

U.S. PATENT DOCUMENTS

| | | | | |
|---|---|---|---|---|
| 5,653,598 A | 8/1997 | Grabbe | | |
| 6,299,458 B1 | 10/2001 | Yamagami et al. | | |
| 7,226,294 B2 | 6/2007 | Shirai et al. | | |
| 11,088,478 B2 * | 8/2021 | Ho | ...................... | H01R 13/2435 |
| 2018/0205168 A1 * | 7/2018 | Ju | ...................... | H01R 13/2435 |
| 2018/0331474 A1 * | 11/2018 | Ju | ...................... | H01R 12/7082 |
| 2019/0173207 A1 * | 6/2019 | Ju | ...................... | H01R 12/7076 |
| 2023/0018797 A1 * | 1/2023 | Jin | ...................... | H01R 13/2407 |

FOREIGN PATENT DOCUMENTS

| | | | | |
|---|---|---|---|---|
| CN | 1744386 A | 3/2006 | | |
| CN | 111029826 A * | 4/2020 | ......... | H01R 13/2435 |

* cited by examiner

*Primary Examiner* — Abdullah A Riyami
*Assistant Examiner* — Nader J Alhawamdeh
(74) *Attorney, Agent, or Firm* — Locke Lord LLP; Tim Tingkang Xia, Esq.

(57) ABSTRACT

An electrical connector includes multiple conductive terminals respectively retained in multiple accommodating slots of an insulating body. Each conductive terminal includes a base portion, a connecting portion extending from one side of the base portion, a first elastic arm and a second elastic arm extending from the connecting portion toward a direction away from the same one side of the base portion, and at least one fixing portion extending from another side of the base portion. A width of the connecting portion is less than a width of the base portion and less than a width of a location of the first elastic arm near the connecting portion as well as a width of a location of the second elastic arm near the connecting portion. The fixing portion and the first elastic arm are respectively located at different sides of the base portion, thus achieving good elasticity and thinness.

12 Claims, 14 Drawing Sheets

100

100

A-A

B-B

C–C

ELECTRICAL CONNECTOR HAVING CONDUCTIVE TERMINALS WITH HIGH DENSITY AND LOW HEIGHT

CROSS-REFERENCE TO RELATED PATENT APPLICATION

This non-provisional application claims priority to and the benefit of, pursuant to 35 U.S.C. § 119(a), patent application Serial No. CN202121630699.1 filed in China on Jul. 16, 2021. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical connector, and particularly to an electrical connector having conductive terminals with a high density and low heights that can be compressed dually.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The Chinese Patent No. CN200510103644.4 discloses an electrical connector, which includes an insulating shell and a plurality of contacts. The contacts are flat plate shaped components mounted on the shell, and each contact has: a supporting portion embedded in a contact supporting portion of the insulating shell to be supported; two cantilever beams extending from the supporting portion, including an upper lateral beam and a lower lateral beam integrally formed through the supporting portion of the contact; and contact portions formed at front ends of the upper and lower lateral beams to be respectively in contact with a contact point of a first circuit and a contact point of a second circuit, thereby facilitating electrical connection among the components. The electrical connector has the following deficiencies:

(1) The supporting portion and the upper and lower lateral beams are provided in a left-right direction, which may reduce the height of each contact and is conducive to thinness of the electrical connector. However, the supporting portion and the upper and lower lateral beams are provided in the left-right direction, which causes each contact to have a greater length in the left-right direction, which is not conducive to the density of the contacts.

(2) The width of the supporting portion is relatively greater than the widths of the upper and lower lateral beams. Further, the supporting portion and the contact supporting portion are in interference fit, and one side of the lower lateral beam close to the contact supporting portion is provided with a protrusion to be in interference fit with the contact supporting portion. Thus, the supporting portion and a portion of the lower lateral beam are both in interference fit with and fixed to the contact supporting portion and thus cannot move, and the structures of the upper and lower lateral beams that can be elastically deformable are limited, which is not conducive to maintaining the good elastic pressing contact between the upper and lower lateral beams and the contact point of the first circuit and the contact point of the second circuit, respectively.

Therefore, a heretofore unaddressed need to design an improved electrical connector exists in the art to address the aforementioned deficiencies and inadequacies.

SUMMARY

In view of the deficiency of the background, the present invention is directed to an electrical connector, in which gaps exist between a connecting portion and an inner wall of the corresponding accommodating slot along a vertical direction, and a width of the connecting portion is less than a width of a location of the corresponding first elastic arm adjacent to the connecting portion, a width of a location of the corresponding second elastic arm adjacent to the connecting portion, and a width of the base portion. Compared to the electrical connector of the background, the connecting portion of such conductive terminal may move and has better elasticity. Meanwhile, the conductive terminals are formed by punching and blanking, and are thus easy to manufacture. Compared to the case where the fixing portion and the first elastic arm are located at a same side of the base portion, in which the fixing portion occupies certain height in the scenario where the heights of the first elastic arm and the second elastic arm are identical, which is not conducive to the thinness, in each conductive terminal of the electrical connector, the fixing portion and the first elastic arm are located at different sides of the base portion, thus achieving good elasticity and thinness.

To achieve the foregoing objective, the present invention adopts the following technical solutions.

An electrical connector is configured for a first electronic component to be electrically connected thereto, and configured to be mounted to a second electronic component. The electrical connector includes: an insulating body, provided with a plurality of accommodating slots; and a plurality of conductive terminals, respectively retained in the accommodating slots. Each of the conductive terminals includes: a base portion; a connecting portion extending from one side of the base portion; a first elastic arm and a second elastic arm extending from the connecting portion toward a direction away from the same one side of the base portion, wherein the first elastic arm and the second elastic arm are formed by punching and blanking, a width of the connecting portion is less than a width of the base portion, the width of the connecting portion is less than a width of a location of the first elastic arm adjacent to the connecting portion, the width of the connecting portion is less than a width of a location of the second elastic arm adjacent to the connecting portion, and when the first elastic arm abuts the first electronic component and the second elastic arm abuts the second electronic component, the connecting portion, the first elastic arm and the second elastic arm are applied with forces and elastically deform altogether on a plane in a force applying direction, and the connecting portion, the first elastic arm and the second elastic arm on the plane form gaps with an inner wall of a corresponding one of the accommodating slots; and at least one fixing portion extending from another side of the base portion, wherein the fixing portion and the first elastic arm are respectively located at different sides of the base portion, and the fixing portion and the inner wall of the corresponding one of the accommodating slots abut and are fixed to each other.

In certain embodiments, the first elastic arm, the second elastic arm, the connecting portion, the base portion and the fixing portion are located on the same plane, the first elastic arm and the second elastic arm are provided symmetrically, the location of the first elastic arm adjacent to the connecting portion and the location of the second elastic arm adjacent to the connecting portion are connected to form a bridge portion, the connecting portion is connected to the bridge portion, and the width of the connecting portion is less than a width of the bridge portion.

In certain embodiments, the connecting portion is relatively away from the second elastic arm and close to the first elastic arm, and the fixing portion extends toward the second electronic component and passes beyond the bridge portion or is flush with the bridge portion.

In certain embodiments, each of the accommodating slots has a first receiving space, a second receiving space and a third receiving space in communication with one another, two sides of the second receiving space are respectively in communication with the first receiving space and the third receiving space, the first elastic arm and the second elastic arm are located in the first receiving space, the connecting portion is located in the second receiving space, the base portion is located in the third receiving space, a fixing space is in communication with the third receiving space, the fixing portion is fixedly provided in the fixing space, a first gap exists between the connecting portion and an inner wall of the second receiving space, a second gap exists between the first elastic arm and an inner wall of the first receiving space, a third gap exists between the second elastic arm and the inner wall of the first receiving space, and the first gap and the third gap are directly in communication with each other.

In certain embodiments, the first elastic arm and the second elastic arm are suspended in the first receiving space, and the connecting portion is suspended in the second receiving space.

In certain embodiments, the connecting portion extends obliquely from the base portion toward the second electronic component and is connected to the first elastic arm and the second elastic arm.

In certain embodiments, the connecting portion bends and extends laterally from the base portion, each of the first elastic arm and the second elastic arm is provided to form an included angle with the base portion, and the fixing portion extends beyond the connecting portion and abuts the inner wall of the corresponding one of the accommodating slots.

In certain embodiments, the connecting portion bends and extends laterally from the base portion, the base portion, the first elastic arm and the second elastic arm are parallel to one another, and the fixing portion extends beyond the connecting portion and abuts the inner wall of the corresponding one of the accommodating slots.

In certain embodiments, each of the accommodating slots has a first position limiting slot and a second position limiting slot, a width of the first position limiting slot is less than a width of the second position limiting slot, two fixing portions respectively extend from different sides of the base portion, one of the two fixing portions is fixed in the first position limiting slot, the other of the two fixing portions is fixed in the second position limiting slot, a length of the one of the two fixing portions fixed in the first position limiting slot is less than a length of the other of the two fixing portions fixed in the second position limiting slot, and the one of the two fixing portions is fixed in the first position limiting slot after being inserted into the first position limiting slot from the second position limiting slot.

In certain embodiments, the connecting portion is located between the two fixing portions, and gaps exist between the connecting portion and each of the two fixing portions.

Compared with the related art, certain embodiments of the present invention have the following beneficial effects. The first elastic arm and the second elastic arm are formed by punching and blanking, and are thus easy to manufacture. Further, the normal forces of the first elastic arm and the second elastic arm abutting the first electronic component and the second electronic component are large. The connecting portion, the first elastic arm and the second elastic arm on the plane form gaps with the inner wall of the corresponding accommodating slot, and the connecting portion, the first elastic arm and the second elastic arm may all elastically deform. Further, the width of the connecting portion is less than the width of the base portion, the width of the connecting portion is less than the width of the location of the first elastic arm adjacent to the connecting portion, and the width of the connecting portion is less than the width of the location of the second elastic arm adjacent to the connecting portion. Compared to the case where a conductive terminal has a connecting portion with a greater width, the connecting portion has better elasticity, which is conducive to maintaining the good elastic pressing contact between the first elastic arm and the contact point of the first electronic component and between the second elastic arm and the contact point of the second electronic component. The fixing portion and the first elastic arm are located at different sides of the base portion. Compared to the case where the fixing portion and the first elastic arm are located at a same side of the base portion, in the scenario where the heights of the first elastic arm and the second elastic arm are identical, the fixing portion in the present invention does not need to occupy a certain height which is conducive to the thinness of the electrical connector. By reducing the heights thereof, the movements of the first elastic arm and the second elastic arm along the vertical direction are not affected by the corresponding distances from the fixing portion, such that the ranges of the movements are larger, thus maintaining better elasticity of the first elastic arm and the second elastic arm. The fixing portion and the inner wall of the corresponding accommodating slot abut and are fixed with each other, thereby ensuring the stability of each conductive terminal in the corresponding accommodating slot.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
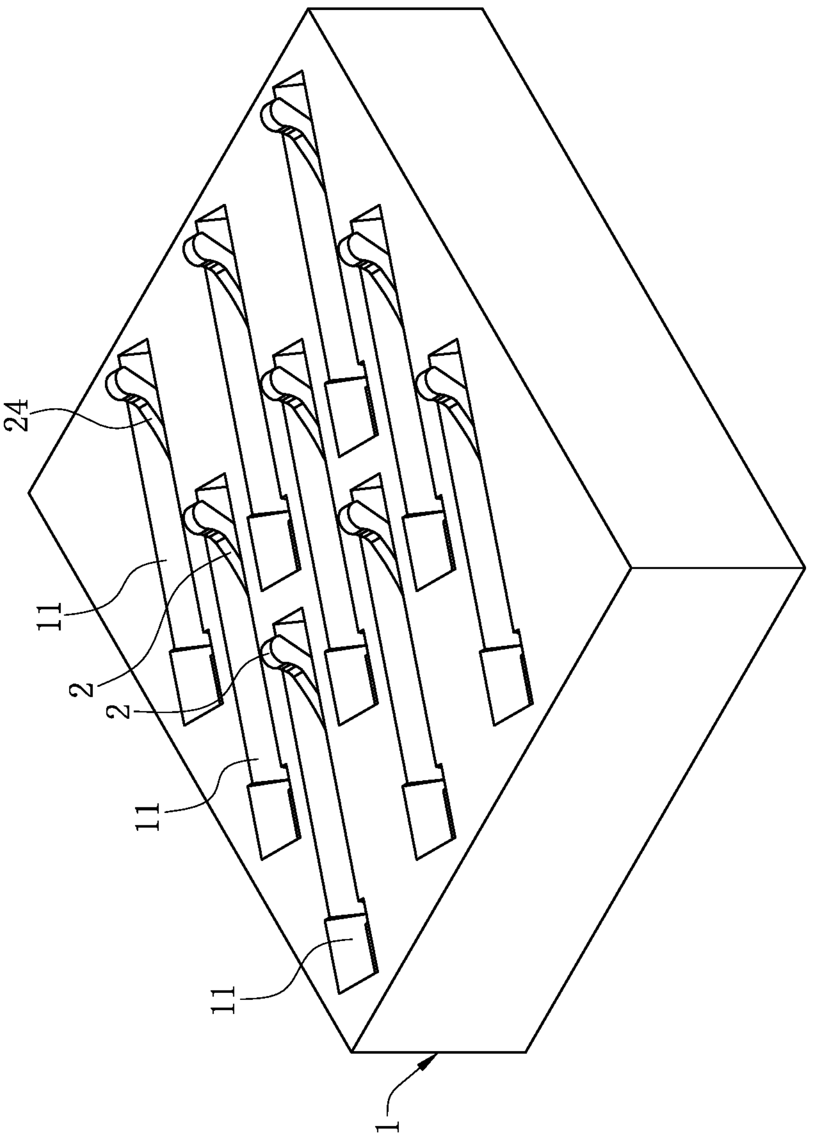
FIG. 1 is an assembled view of an electrical connector according to a first embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-14. In accordance with the purposes of this invention, as embodied and broadly described herein, this invention, in one aspect, relates to an electrical connector.

Figure 2:
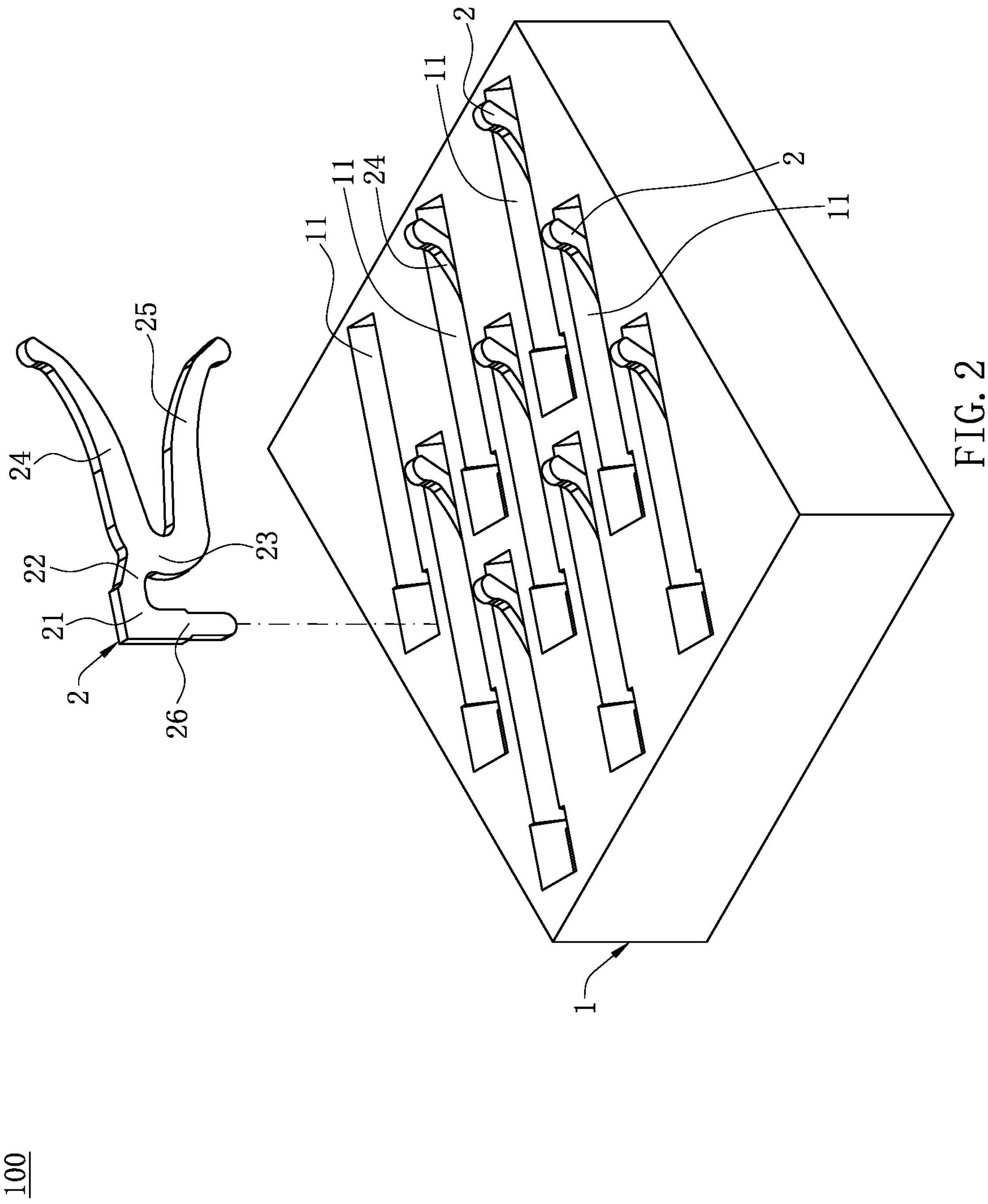
FIG. 2 is a schematic view showing an assembling process for assembling the conductive terminals in FIG. 1 to the insulating body.
Figure 3:
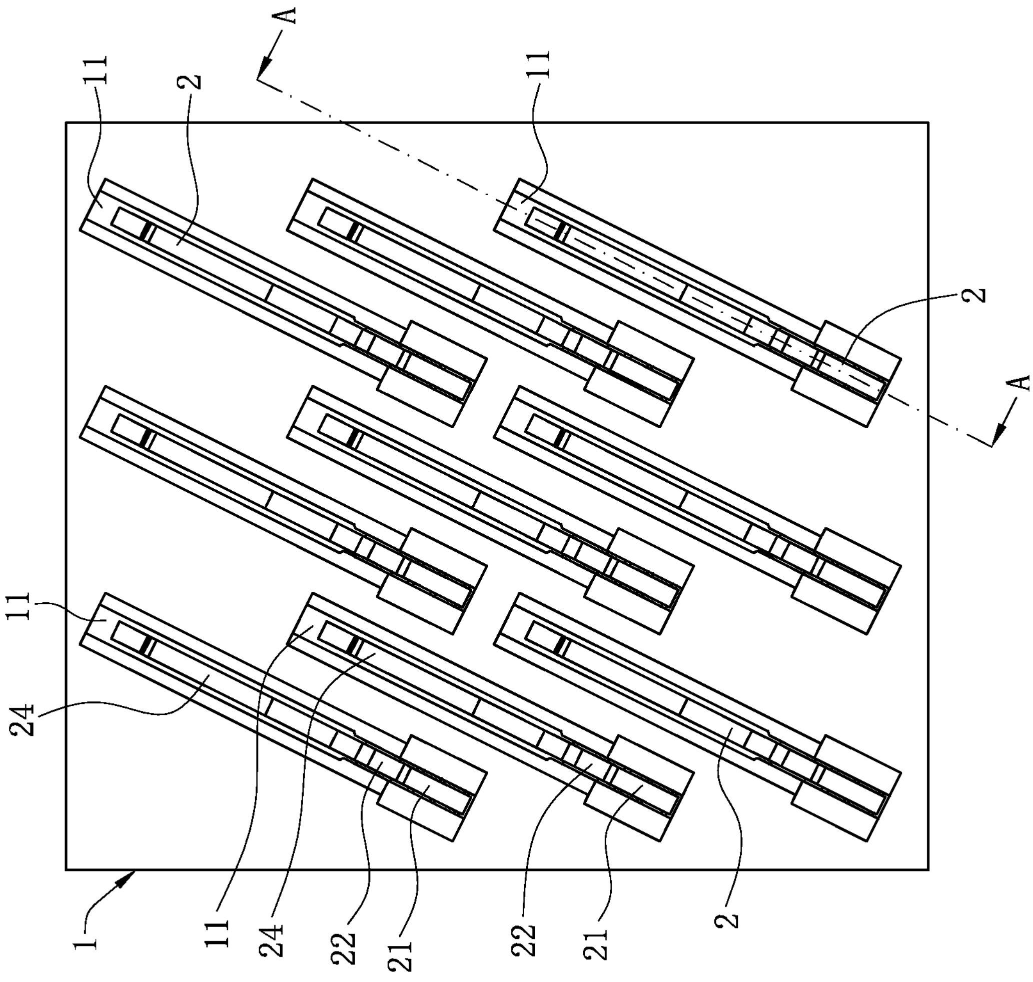
FIG. 3 is a top view of FIG. 1.
Figure 8:
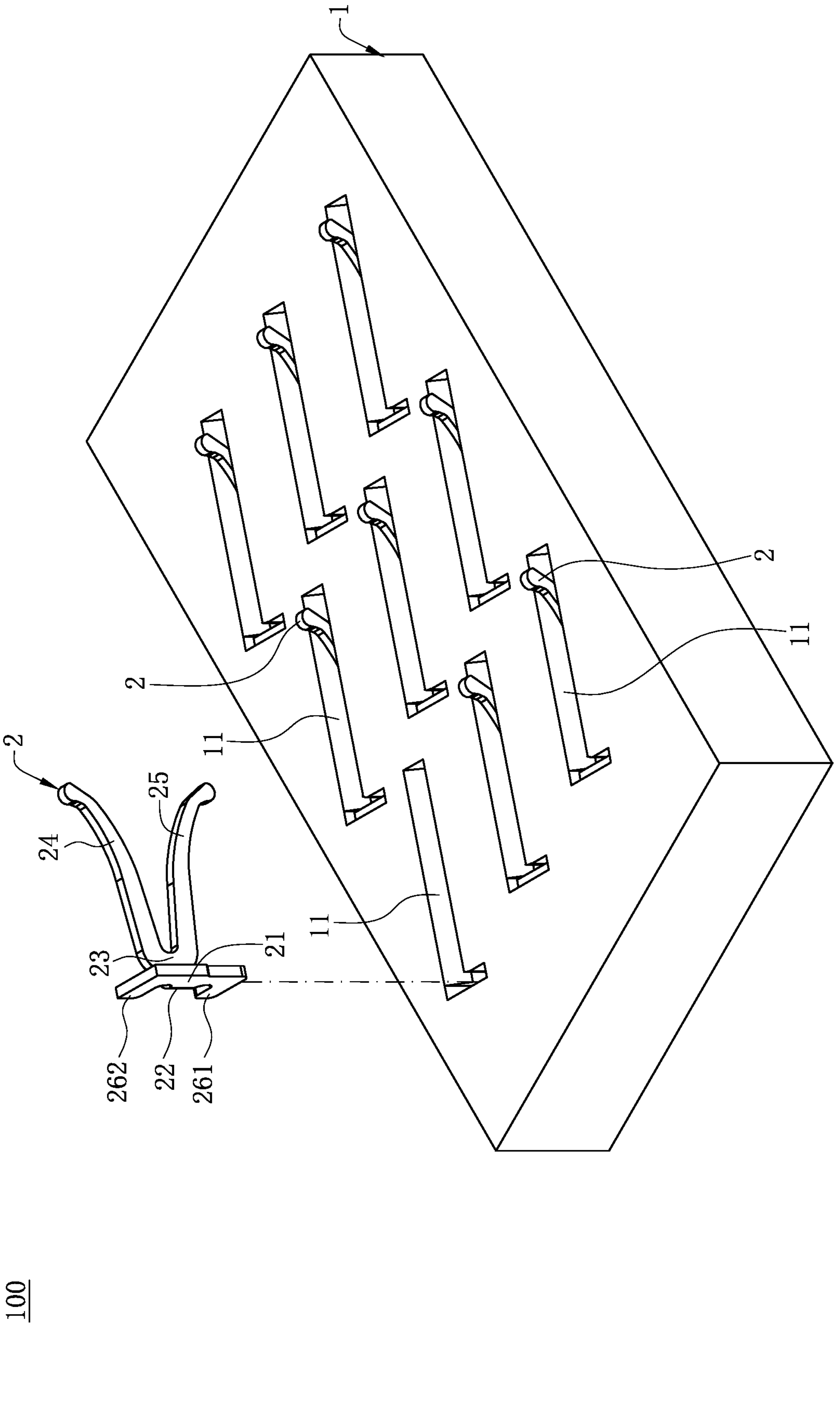
FIG. 8 is a schematic view showing an assembling process for assembly the conductive terminals in FIG. 7 to the insulating body.
Figure 12:
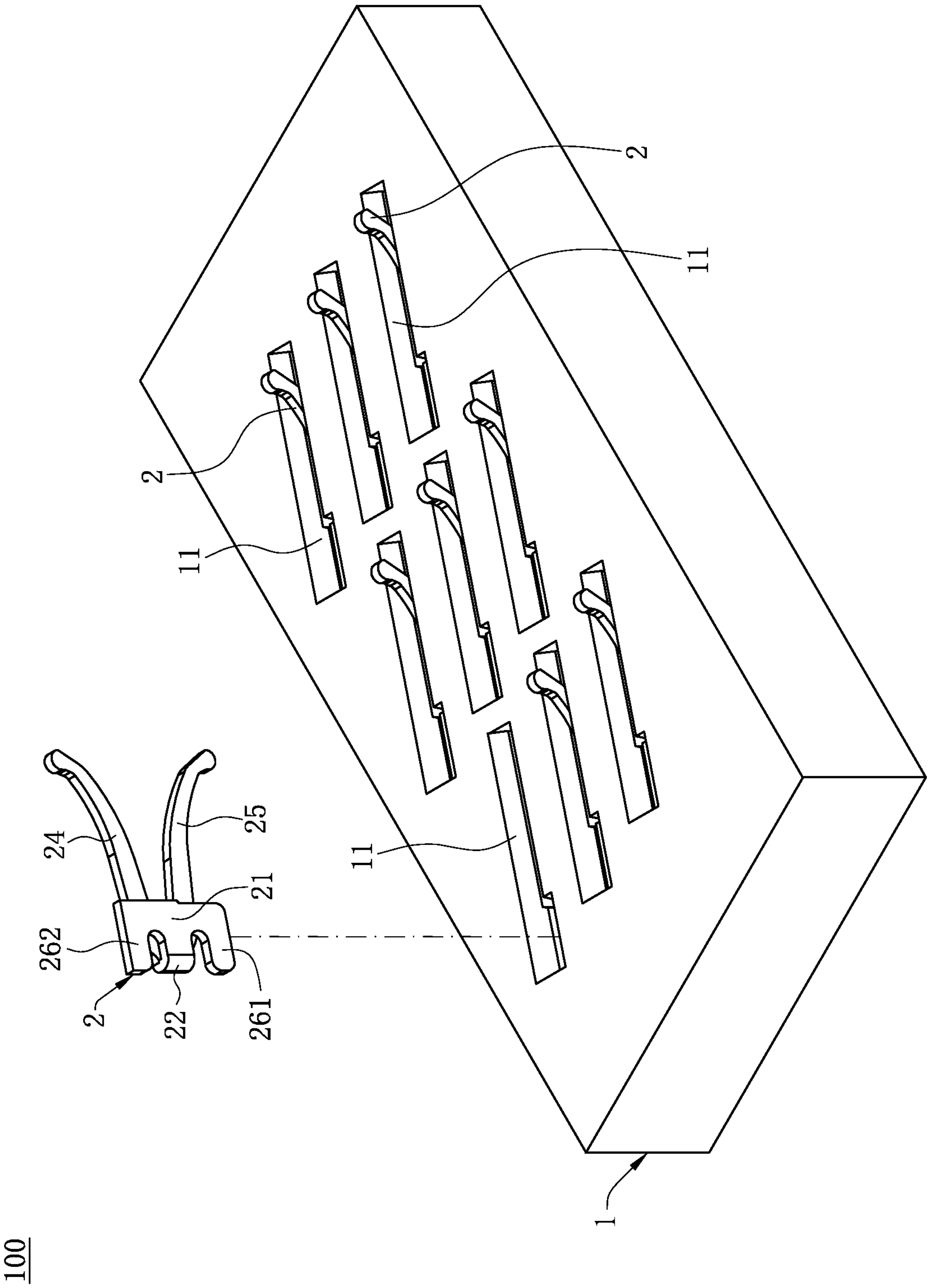
FIG. 12 is a schematic view showing an assembling process for assembly the conductive terminals in FIG. 11 to the insulating body.

As shown in FIG. 2, FIG. 8 and FIG. 12, in the electrical connector 100 according to certain embodiments of the present invention, a vertical direction (a direction for the conductive terminals 2 to be assembled to the insulating body 1) and a left-right direction (a horizontal direction) are defined. In other embodiments, the vertical direction and the left-right direction may switch.

FIG. 1 to FIG. 6 show an electrical connector 100 according to a first embodiment of the present invention, which includes an insulating body 1 and a plurality of conductive terminals 2 accommodated in the insulating body 1. The conductive terminals 2 are arranged in a plurality of rows along a front-rear direction, and the conductive terminals 2 upward abut a first electronic component 200 located thereabove and downward abut a second electronic component 300 located therebelow.

Figure 4:
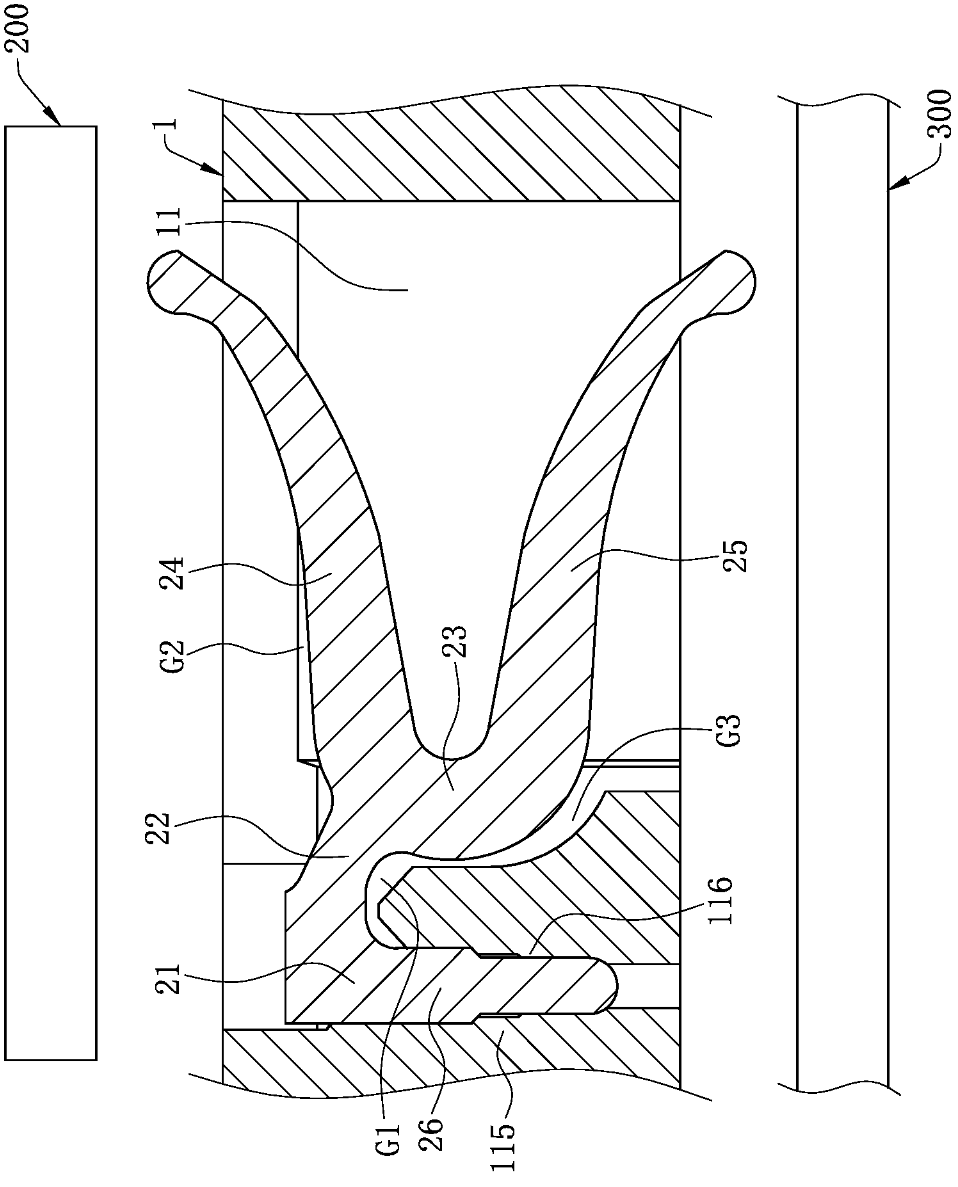
FIG. 4 is a sectional view of the electrical connector in FIG. 3 along a line A-A.
Figure 6:
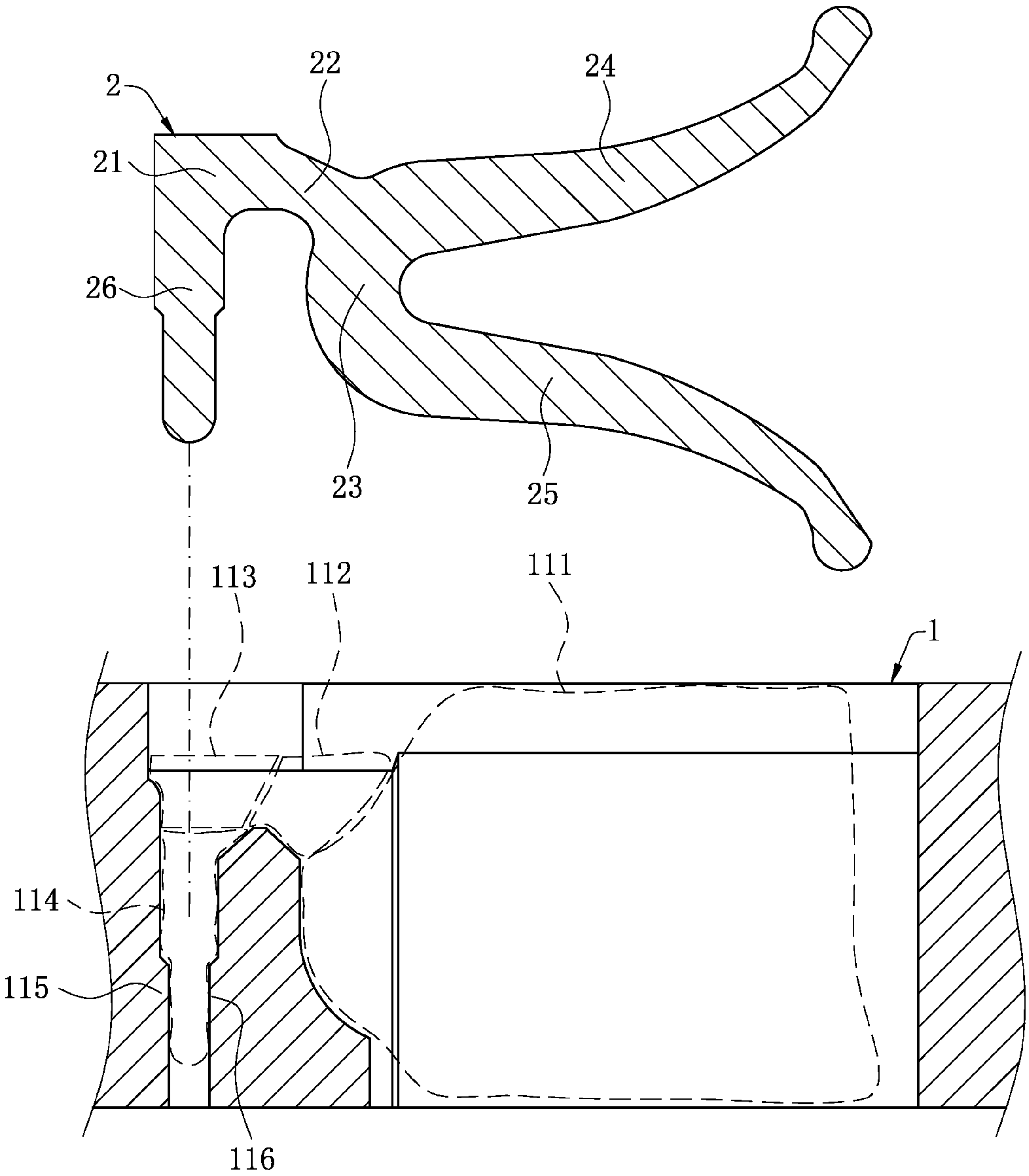
FIG. 6 is a partially exploded sectional view of the electrical connector in FIG. 3 along the line A-A.

As shown in FIG. 2, FIG. 4 and FIG. 6, the insulating body 1 is provided with a plurality of accommodating slots 11. Each accommodating slot 11 has a first receiving space 111, a second receiving space 112, a third receiving space 113 and a fixing space 114 in communication with one another. Two sides of the second receiving space 112 are respectively in communication with the first receiving space 111 and the third receiving space 113. The fixing space 114 is in communication with the third receiving space 113. A left side of each accommodating slot 11 is provided with a position limiting portion 115, and a lower side of each accommodating slot 11 is provided with a stopping portion 116.

Figure 5:
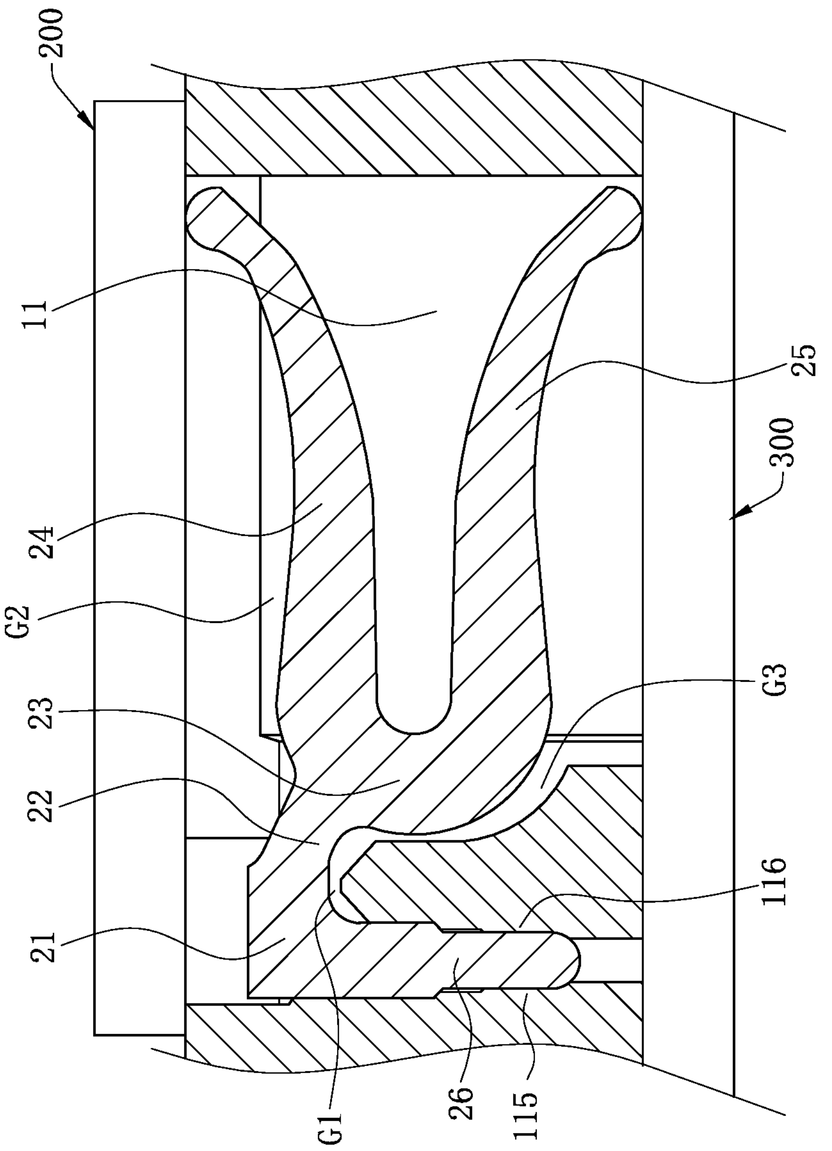
FIG. 5 is a sectional view of the electrical connector in FIG. 3 along the line A-A after abutting a first electronic component and a second electronic component.

As shown in FIG. 4, FIG. 5 and FIG. 6, each conductive terminal 2 includes: a base portion 21, located in the third receiving space 113; a connecting portion 22 extending from one side of the base portion 21; a first elastic arm 24 and a second elastic arm 25 extending from the connecting portion 22 toward a direction away from the same one side of the base portion 21, where the first elastic arm 24 and the second elastic arm 25 are suspended in the first receiving space 111, and the connecting portion 22 is suspended in the second receiving space 112; the location of the first elastic arm 24 adjacent to the connecting portion 22 and the location of the second elastic arm 25 adjacent to the connecting portion 22 are connected to form a bridge portion 23; and a fixing portion 26 extending from another side of the base portion 21. The fixing portion 26 and the first elastic arm 24 are respectively located at different sides of the base portion. Compared to the case where the fixing portion 26 and the first elastic arm 24 are located at a same side of the base portion 21, in the scenario where the heights of the first elastic arm 24 and the second elastic arm 25 are identical, the fixing portion 26 does not need to occupy a certain height, which is conducive to the thinness of the electrical connector 100. Further, the first elastic arm 24, the second elastic arm 25, the connecting portion 22, the base portion 21 and the fixing portion 26 are located on the same plane, and are formed by punching and blanking, which are thus easy to manufacture. Further, the normal forces of the first elastic arm 24 and the second elastic arm 25 respectively abutting the first electronic component 200 and the second electronic component 300 are large.

As shown in FIG. 4, FIG. 5 and FIG. 6, the connecting portion 22 is located in the second receiving space 112. The connecting portion 22 extends obliquely from the base portion 21 toward the second electronic component 300 and is connected to the first elastic arm 24 and the second elastic arm 25. The connecting portion 22 is relatively away from the second elastic arm 25 and close to the first elastic arm 24. A width of the connecting portion 22 is less than a width of the base portion 21, the width of the connecting portion 22 is less than a width of a location of the first elastic arm 24 adjacent to the connecting portion 22, and the width of the connecting portion 22 is less than a width of a location of the second elastic arm 25 adjacent to the connecting portion 22. Thus, the elasticity of the connecting portion 22 is good. Further, a first gap G1 exists between the connecting portion 22 and an inner wall of the second receiving space 112. When the first elastic arm 24 abuts the first electronic component 200 and the second elastic arm 25 abuts the second electronic component 300, the connecting portion 22 is applied with a force and elastically deform in the first gap G1.

As shown in FIG. 4, FIG. 5 and FIG. 6, the first elastic arm 24 and the second elastic arm 25 are located in the first receiving space 111. A second gap G2 exists between the first elastic arm 24 and an inner wall of the first receiving space 111, and a third gap G3 exists between the second elastic arm 25 and the inner wall of the first receiving space 111. The first gap G1 and the third gap G3 are directly in communication with each other. The first elastic arm 24 and the second elastic arm 25 are suspended in the first receiving space 111, and the connecting portion 22 is suspended in the second receiving space 112. When the first elastic arm 24 abuts the first electronic component 200 and the second elastic arm 25 abuts the second electronic component 300, the bridge portion 23, the connecting portion 22, the first elastic arm 24 and the second elastic arm 25 are applied with forces and elastically deform altogether on a plane in a force applying direction. The first elastic arm 24 and the second elastic arm 25 may perform adjustments at a maximum degree, thereby accurately abut the first electronic component 200 and the second electronic component 300, without having abutting failures. Further, by forming the first elastic arm 24 and the second elastic arm 25 by punching and blanking and providing the first elastic arm 24 and the second elastic arm 25 symmetrically, the manufacturing is easy, and the normal forces of the first elastic arm 24 and the second elastic arm 25 respectively abutting the first electronic component 200 and the second electronic component 300 are large to perform compensation. Thus, the elasticity and contact forces are altogether balanced, such that the first electronic component 200 and the second electronic component 300 may be electrically connected with each of the conductive terminals 2 accurately.

As shown in FIG. 4, FIG. 5 and FIG. 6, the fixing portion 26 is fixedly provided in the fixing space 114. The fixing portion 26 abuts inner walls of the position limiting portion 115 and the stopping portion 116. The fixing portion 26 extends toward the second electronic component 300 and passes beyond the bridge portion 23 or is flush with the bridge portion 23, which is conducive to extending the height of the fixing portion 26, such that the contact between the fixing portion 26 and the corresponding accommodating slot 11 is more stable, thereby ensuring the stability of each conductive terminal 2 in the corresponding accommodating slot 11.

In the assembly and application of the electrical connector 100, each conductive terminal 2 is inserted into the corresponding accommodating slot 11 downward from top thereof, until the fixing portion 26 abuts the inner walls of the position limiting portion 115 and the stopping portion 116 and is fixed in the fixing space 114. The first elastic arm 24 passes upward beyond the corresponding accommodating slot 11 to upward abut the first electronic component 200, and the second elastic arm 25 passes downward beyond the corresponding accommodating slot 11 to downward abut the second electronic component 300.

FIG. 7 to FIG. 10 show an electrical connector 100 according to a second embodiment of the present invention.

Figure 7:
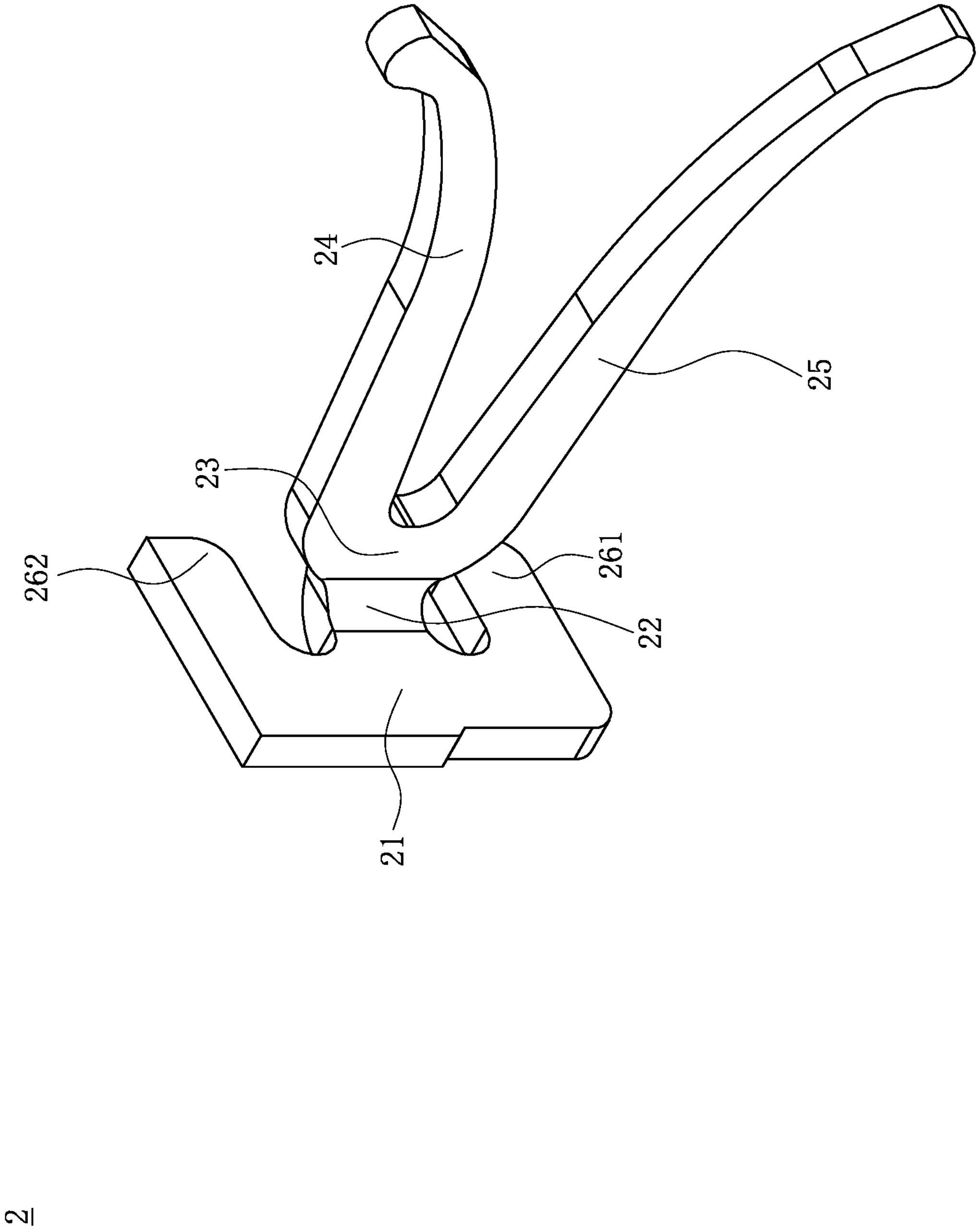
FIG. 7 is a schematic view of conductive terminals of an electrical connector according to a second embodiment of the present invention.
Figure 9:
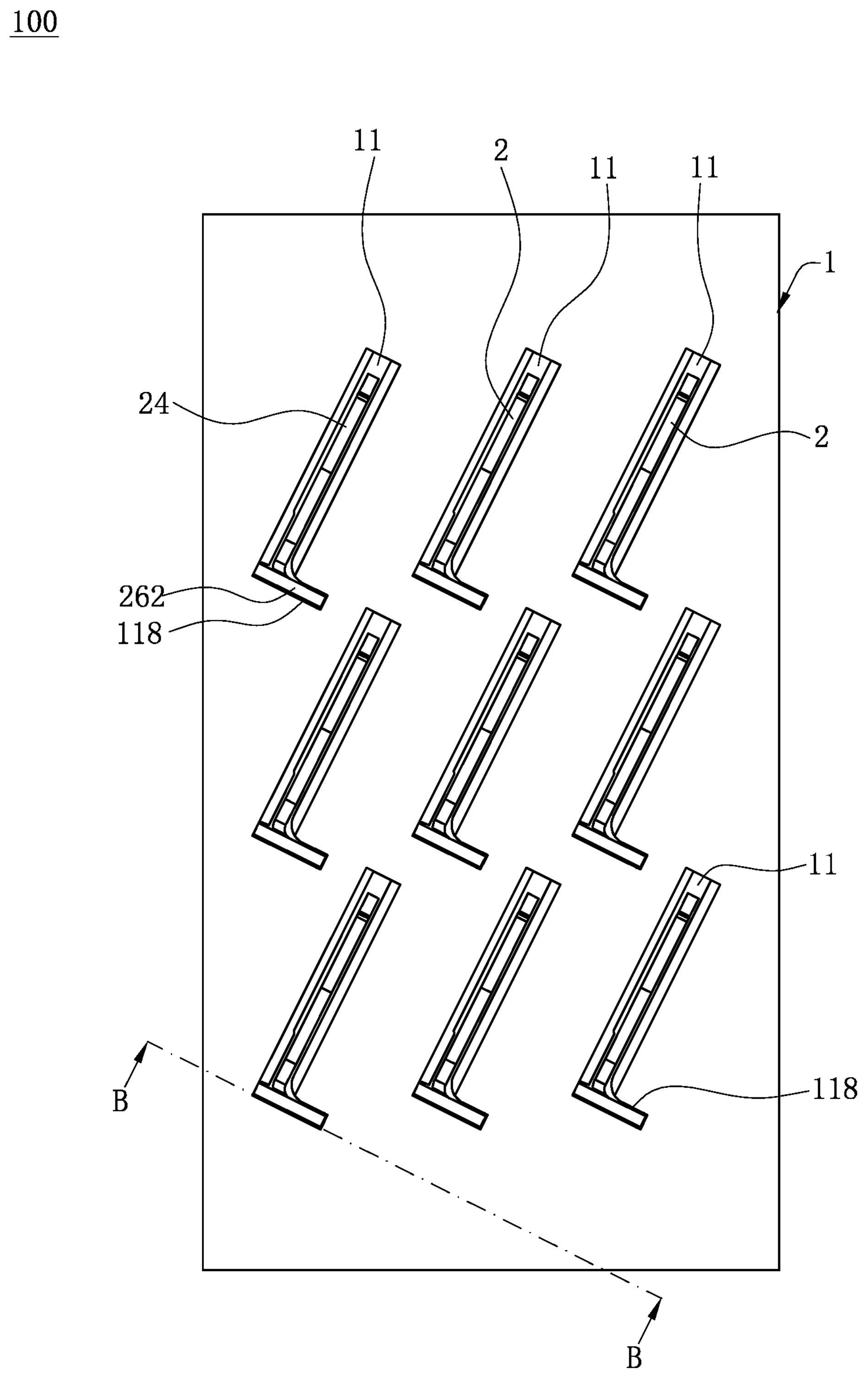
FIG. 9 is a top view of the electrical connector according to the second embodiment of the present invention.
Figure 10:
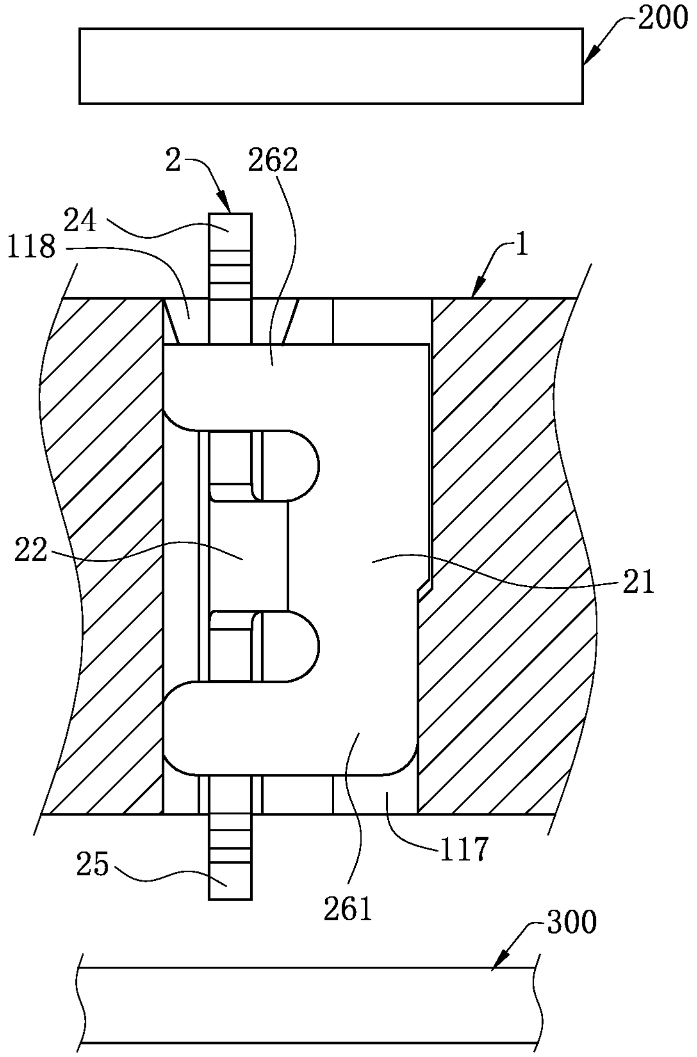
FIG. 10 is a sectional view of the electrical connector in FIG. 9 along a line B-B.

As shown in FIG. 7, FIG. 9 and FIG. 10, the main differences of this embodiment from the first embodiment exist in that: each accommodating slot 11 has a first position limiting slot 117 and a second position limiting slot 118, and a width of the first position limiting slot 117 is less than a width of the second position limiting slot 118. The connecting portion 22 is formed by bending 90° laterally and extending from the base portion 21. Each of the first elastic arm 24 and the second elastic arm 25 is provided to form a 90° included angle with the base portion 21. Two fixing portions 261 and 262 respectively extend from different sides of the base portion 21, the first fixing portion 261 is fixed in the first position limiting slot 117, and the second fixing portion 262 is fixed in the second position limiting slot 118. A length of the first fixing portion 261 is less than a length of the second fixing portion 262. The connecting portion 22 is located between the first fixing portion 261 and the second fixing portion 262, and gaps exist between the connecting portion 22 and the first fixing portion 261 and between the connecting portion 22 and the second fixing portion 262. The first fixing portion 261 is fixed in the first position limiting slot 117 after being inserted into the first position limiting slot 117 from the second position limiting slot 118. The first fixing portion 261 and the second fixing portion 262 extend beyond the connecting portion 22 and abut the inner wall of the corresponding accommodating slot 11, such that the fixing of each conductive terminal 2 is more stable.

Compared to the first embodiment, in the second embodiment, each of the first elastic arm 24 and the second elastic arm 25 is provided to form a 90° included angle with the base portion 21, and the length of each conductive terminal 2 is reduced. Further, the lengths of the elastic arms almost extend to reach the length of the whole conductive terminal 2, thereby achieving density of the conductive terminals 2. In other words, the first embodiment and the second embodiment may be used to match with different usage occasions. Other structures of this embodiments are basically identical to those of the first embodiment, and are thus not further hereinafter elaborated.

In the assembly and application of the electrical connector 100, each conductive terminal 2 is inserted into the corresponding accommodating slot 11 downward from top thereof, and the first fixing portion 261 is fixed in the first position limiting slot 117 after being inserted into the first position limiting slot 117 from the second position limiting slot 118. The first elastic arm 24 passes upward beyond the corresponding accommodating slot 11 to upward abut the first electronic component, and the second elastic arm 25 passes downward beyond the corresponding accommodating slot 11 to downward abut the second electronic component 300.

FIG. 11 to FIG. 14 show an electrical connector 100 according to a third embodiment of the present invention.

Figure 11:
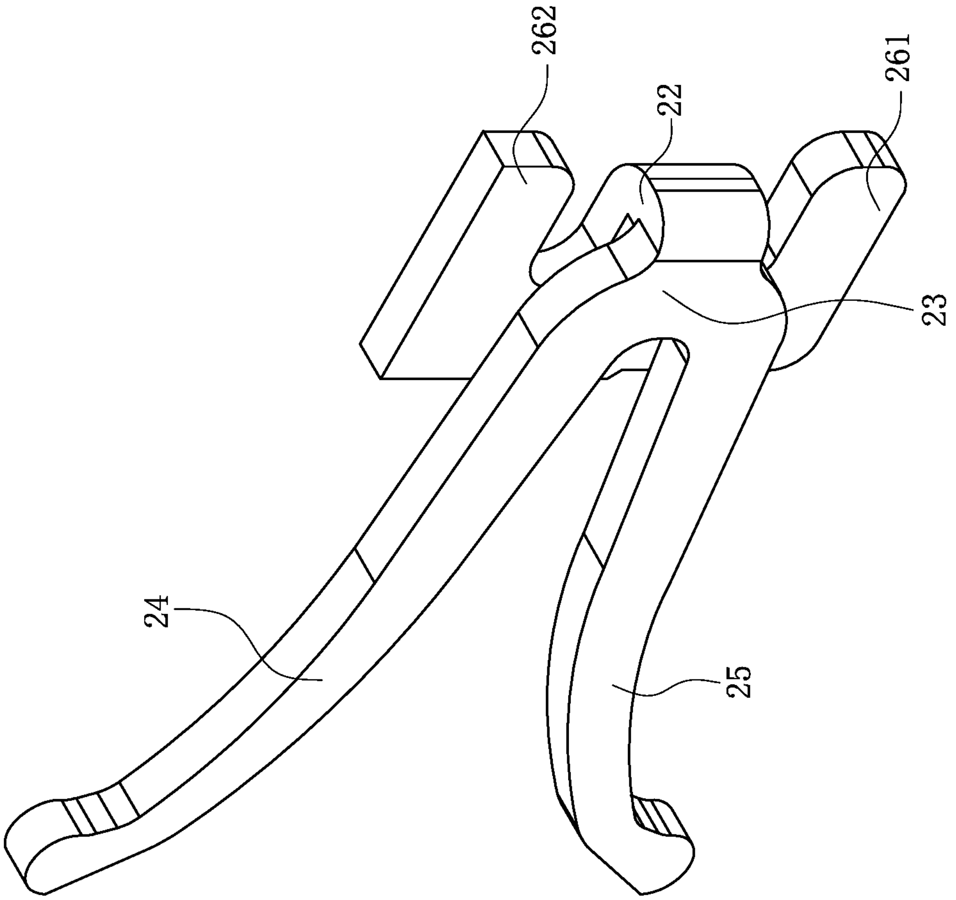
FIG. 11 is a schematic view of conductive terminals of an electrical connector according to a third embodiment of the present invention.
Figure 13:
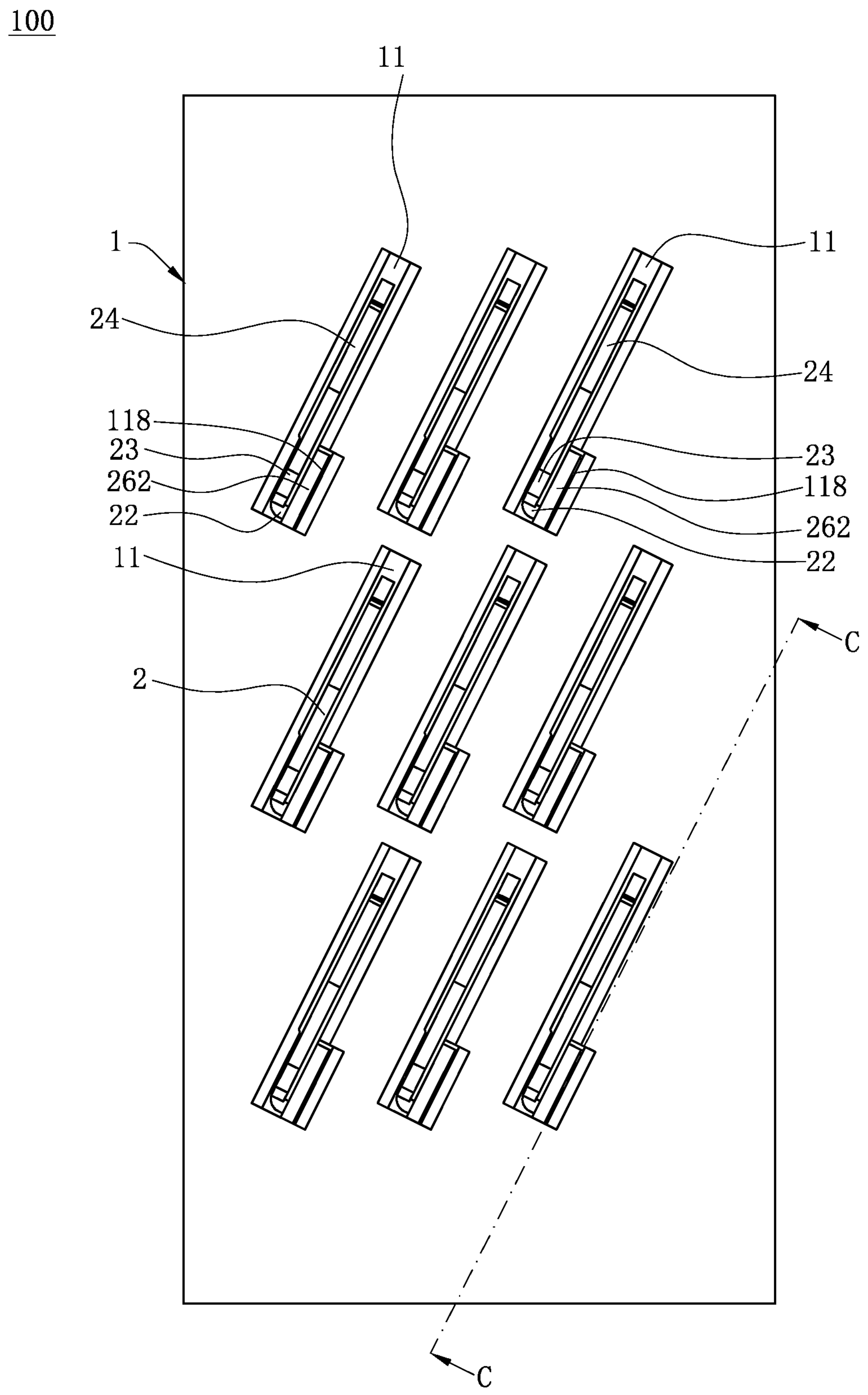
FIG. 13 is a top view of the electrical connector according to the third embodiment of the present invention.
Figure 14:
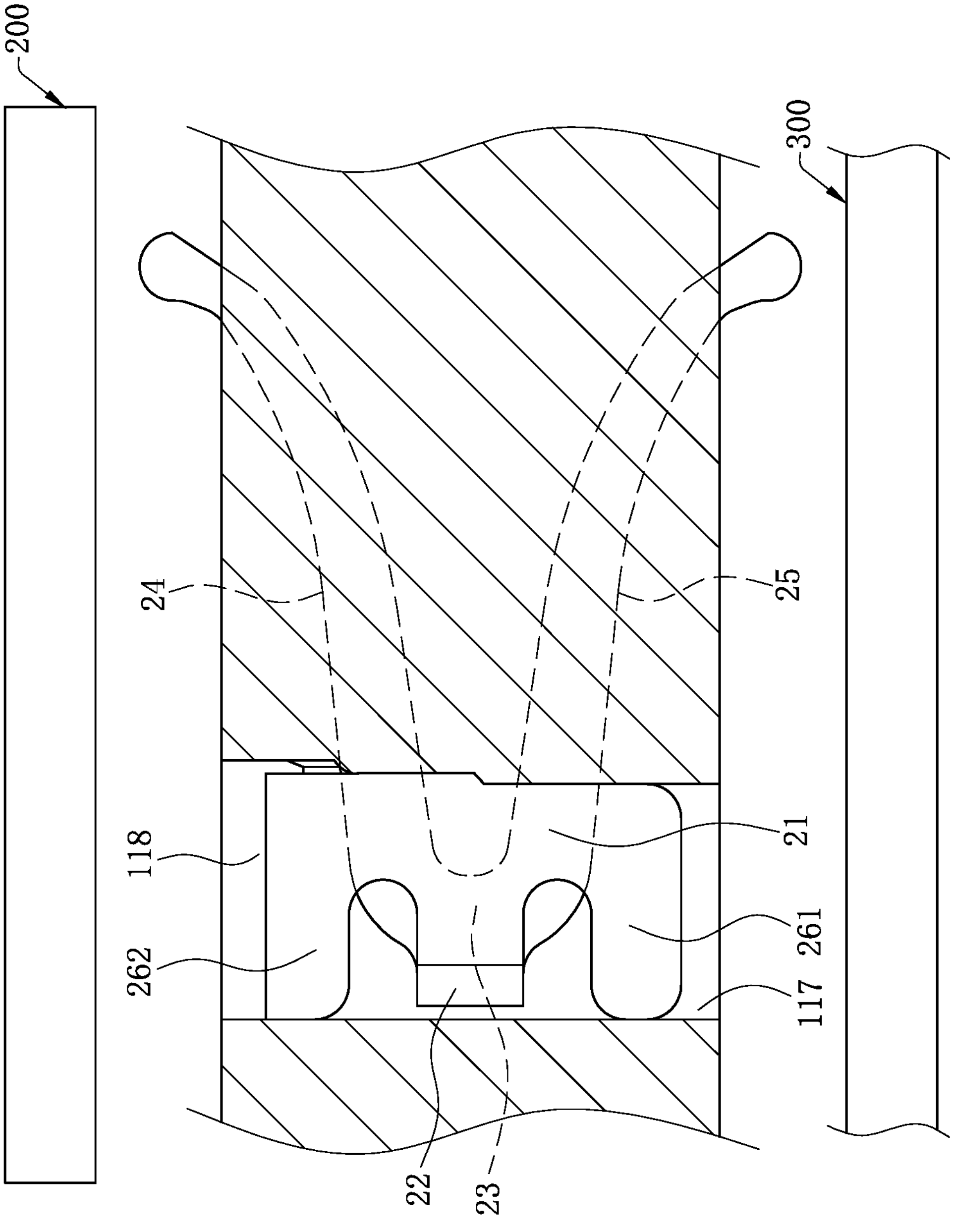
FIG. 14 is a sectional view of the electrical connector in FIG. 13 along a line C-C.

As shown in FIG. 11, FIG. 13 and FIG. 14, the main differences of this embodiment from the second embodiment exist in that: the connecting portion 22 is formed by bending 180° reversely and extending from the base portion 21, and each of the first elastic arm 24 and the second elastic arm 25 is provided to form an 180° included angle with the base portion 21. The base portion 21, the first elastic arm 24 and the second elastic arm 25 are parallel to one another.

Compared to the second embodiment, in the third embodiment, the connecting portion 22 bends and extends reversely from the base portion 21, and each of the first elastic arm 24 and the second elastic arm 25 is provided to form an 180° included angle with the base portion 21. The connecting portion 22 bends and extends reversely from the base portion 21, and the base portion 21, the first elastic arm 24 and the second elastic arm 25 are parallel to one another. In the second embodiment, the width of each conductive terminal 2 along the front-rear direction is the width of the second fixing portion 262. In a scenario where the length of the conductive terminal 2 is not changed, in the third embodiment, the width of each conductive terminal 2 along the front-rear direction is less than the width of the second fixing portion 262, thereby allowing density of the conductive terminals 2. Further, the first fixing portion 261 and the second fixing portion 262 extend beyond the connecting portion 22 and abut the inner wall of the corresponding accommodating slot 11, such that the fixing of each conductive terminal 2 is more stable. Other structures of this embodiments are basically identical to those of the second embodiment, and are thus not further hereinafter elaborated.

In sum, the electrical connector 100 according to certain embodiments of the present invention has the following beneficial effects:

(1) The first elastic arm 24 and the second elastic arm 25 are formed by punching and blanking, and are thus easy to manufacture. Further, the normal forces of the first elastic arm 24 and the second elastic arm 25 abutting the first electronic component 200 and the second electronic component 300 are large. The connecting portion 22, the first elastic arm 24 and the second elastic arm 25 on the plane form gaps with the inner wall of the corresponding accommodating slot 11, and the connecting portion 22, the first elastic arm 24 and the second elastic arm 25 may all elastically deform. Further, the width of the connecting portion 22 is less than the width of the base portion 21, the width of the connecting portion 22 is less than the width of the location of the first elastic arm 24 adjacent to the connecting portion 22, and the width of the connecting portion 22 is less than the width of the location of the second elastic arm 25 adjacent to the connecting portion 22. Compared to the case where a conductive terminal 2 has a connecting portion 22 with a greater width, the connecting portion 22 has better elasticity, which is conducive to maintaining the good elastic pressing contact between the first elastic arm 24 and the contact point of the first electronic component 200 and between the second elastic arm 25 and the contact point of the second electronic component 300. The fixing portion 26 and the first elastic arm 24 are located at different sides of the base portion 21. Compared to the case where the fixing portion 26 and the first elastic arm 24 are located at a same side of the base portion 21, in the scenario where the heights of the first elastic arm 24 and the second elastic arm 25 are identical, the fixing portion 26 in the present invention does not need to occupy a certain height, which is conducive to the thinness of the electrical connector. By reducing the heights thereof, the movements of the first elastic arm 24 and the second elastic arm 25 along the vertical direction are not affected by the corresponding distances from the fixing portion 26, such that the ranges of the movements are larger, thus maintaining better elasticity of the first elastic arm 24 and the second elastic arm 25.

(2) The connecting portion 22 extends obliquely from the base portion 21 toward the second electronic component 300 and is connected to the first elastic arm 24 and the second elastic arm 25, which is conducive to reducing the height of the first elastic arm 24, thereby reducing the overall height of each conductive terminal 2, and lengthening the first elastic arm 24 and the second elastic arm 25, thereby achieving good elasticity and thinness.

(3) The connecting portion 22 is relatively away from the second elastic arm 25 and close to the first elastic arm 24, and the fixing portion 26 extends toward the second electronic component 300 and passes beyond the bridge portion 23 or is flush with the bridge portion 23, which is conducive to extending the height of the fixing portion 26, such that the contact between the fixing portion 26 and the corresponding accommodating slot 11 is more stable, thereby ensuring the stability of each conductive terminal 2 in the corresponding accommodating slot 11.

(4) The connecting portion 22 is formed by bending 90° laterally and extending from the base portion 21, and each of the first elastic arm 24 and the second elastic arm 25 is provided to form a 90° included angle with the base portion 21. Compared to the case where the base portion 21 is located behind the first elastic arm 24 and the second elastic arm 25, the length of each conductive terminal 2 is reduced, and the lengths of the elastic arms almost extend to reach the length of the whole conductive terminal 2, thereby achieving density of the conductive terminals 2.

(5) The connecting portion 22 is formed by bending 180° reversely and extending from the base portion 21, and each of the first elastic arm 24 and the second elastic arm 25 is provided to form an 180° included angle with the base portion 21. The base portion 21, the first elastic arm 24 and the second elastic arm 25 are parallel to one another. Compared to the case where the base portion 21 is located behind the first elastic arm 24 and the second elastic arm 25, the length of each conductive terminal 2 is reduced, and the lengths of the elastic arms almost extend to reach the length of the whole conductive terminal 2, thereby achieving density of the conductive terminals 2. Further, the width of each conductive terminal 2 along the front-rear direction is reduced, which is further conducive to the density of the conductive terminals 2.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, configured for a first electronic component to be electrically connected thereto, and configured be mounted to a second electronic component, the electrical connector comprising:

an insulating body, provided with a plurality of accommodating slots; and a plurality of conductive terminals, respectively retained in the accommodating slots, wherein each of the conductive terminals comprises:

a base portion;

a connecting portion extending from one side of the base portion;

a first elastic arm and a second elastic arm extending from the connecting portion toward a direction away from the same one side of the base portion, wherein the first elastic arm and the second elastic arm are formed by punching and blanking, a width of the connecting portion is less than a width of the base portion, the width of the connecting portion is less than a width of a location of the first elastic arm adjacent to the connecting portion, the width of the connecting portion is less than a width of a location of the second elastic arm adjacent to the connecting portion, and when the first elastic arm abuts the first electronic component and the second elastic arm abuts the second electronic component, the connecting portion, the first elastic arm and the second elastic arm are applied with forces and elastically deform altogether on a plane in a force applying direction, and the connecting portion, the first elastic arm and the second elastic arm on the plane form gaps with an inner wall of a corresponding one of the accommodating slots; and at least one fixing portion extending from another side of the base portion, wherein the fixing portion and the first elastic arm are respectively located at different sides of the base portion, and the fixing portion and the inner wall of the corresponding one of the accommodating slots abut and are fixed to each other.

2. The electrical connector according to claim 1, wherein the first elastic arm, the second elastic arm, the connecting portion, the base portion and the fixing portion are located on the same plane, the first elastic arm and the second elastic arm are provided symmetrically, the location of the first elastic arm adjacent to the connecting portion and the location of the second elastic arm adjacent to the connecting portion are connected to form a bridge portion, the connecting portion is connected to the bridge portion, and the width of the connecting portion is less than a width of the bridge portion.

3. The electrical connector according to claim 2, wherein the connecting portion is relatively away from the second elastic arm and close to the first elastic arm, and the fixing portion extends toward the second electronic component and passes beyond the bridge portion or is flush with the bridge portion.

4. The electrical connector according to claim 1, wherein each of the accommodating slots has a first receiving space, a second receiving space and a third receiving space in communication with one another, two sides of the second receiving space are respectively in communication with the first receiving space and the third receiving space, the first elastic arm and the second elastic arm are located in the first receiving space, the connecting portion is located in the second receiving space, the base portion is located in the third receiving space, a fixing space is in communication with the third receiving space, the fixing portion is fixedly provided in the fixing space, a first gap exists between the connecting portion and an inner wall of the second receiving space, a second gap exists between the first elastic arm and an inner wall of the first receiving space, a third gap exists between the second elastic arm and the inner wall of the first receiving space, and the first gap and the third gap are directly in communication with each other.

5. The electrical connector according to claim 4, wherein the first elastic arm and the second elastic arm are suspended in the first receiving space, and the connecting portion is suspended in the second receiving space.

6. The electrical connector according to claim 1, wherein the connecting portion extends obliquely from the base portion toward the second electronic component and is connected to the first elastic arm and the second elastic arm.

7. The electrical connector according to claim 1, wherein the connecting portion bends and extends laterally from the base portion, each of the first elastic arm and the second elastic arm is provided to form an included angle with the base portion, and the fixing portion extends beyond the connecting portion and abuts the inner wall of the corresponding one of the accommodating slots.

8. The electrical connector according to claim 7, wherein each of the accommodating slots has a first position limiting slot and a second position limiting slot, a width of the first position limiting slot is less than a width of the second position limiting slot, two fixing portions respectively extend from different sides of the base portion, one of the two fixing portions is fixed in the first position limiting slot, the other of the two fixing portions is fixed in the second position limiting slot, a length of the one of the two fixing portions fixed in the first position limiting slot is less than a length of the other of the two fixing portions fixed in the second position limiting slot, and the one of the two fixing portions is fixed in the first position limiting slot after being inserted into the first position limiting slot from the second position limiting slot.

9. The electrical connector according to claim 8, wherein the connecting portion is located between the two fixing portions, and gaps exist between the connecting portion and each of the two fixing portions.

10. The electrical connector according to claim 1, wherein the connecting portion bends and extends laterally from the base portion, the base portion, the first elastic arm and the second elastic arm are parallel to one another, and the fixing portion extends beyond the connecting portion and abuts the inner wall of the corresponding one of the accommodating slots.

11. The electrical connector according to claim 10, wherein each of the accommodating slots has a first position limiting slot and a second position limiting slot, a width of the first position limiting slot is less than a width of the second position limiting slot, two fixing portions respectively extend from different sides of the base portion, one of the two fixing portions is fixed in the first position limiting slot, the other of the two fixing portions is fixed in the second position limiting slot, a length of the one of the two fixing portions fixed in the first position limiting slot is less than a length of the other of the two fixing portions fixed in the second position limiting slot, and the one of the fixing portions is fixed in the first position limiting slot after being inserted into the first position limiting slot from the second position limiting slot.

12. The electrical connector according to claim 11, wherein the connecting portion is located between the two fixing portions, and gaps exist between the connecting portion and each of the two fixing portions.

* * * * *